(12) United States Patent
Bachmann et al.

(10) Patent No.: US 7,577,152 B2
(45) Date of Patent: Aug. 18, 2009

(54) METHOD AND APPARATUS FOR MODIFICATION OF CONNECTIONS IN A COMMUNICATIONS SYSTEM WHICH IS BASED ON DATA COMPRESSION

(75) Inventors: Frank Bachmann, Berlin (DE); Bart Baekelandt, Melle (DE); Herbert Heiβ, Puchheim (DE); Thierry Nedelec, Miesbach (DE); Norbert Seitter, Unterhaching (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 645 days.

(21) Appl. No.: 10/495,014

(22) PCT Filed: Sep. 11, 2002

(86) PCT No.: PCT/DE02/03472

§ 371 (c)(1),
(2), (4) Date: May 10, 2004

(87) PCT Pub. No.: WO2004/028093

PCT Pub. Date: Apr. 1, 2004

(65) Prior Publication Data

US 2004/0258077 A1    Dec. 23, 2004

(51) Int. Cl.
*H04L 12/56* (2006.01)
*H04J 3/12* (2006.01)

(52) U.S. Cl. .................. 370/395.64; 370/522
(58) Field of Classification Search ............. 370/395.64
See application file for complete search history.

(56) References Cited

U.S. PATENT DOCUMENTS

| | | | | |
|---|---|---|---|---|
| 6,504,845 | B1 * | 1/2003 | Petersen et al. | 370/412 |
| 6,747,977 | B1 * | 6/2004 | Smith et al. | 370/395.64 |
| 6,832,088 | B1 * | 12/2004 | Stumpert | 455/445 |

(Continued)

FOREIGN PATENT DOCUMENTS

JP    61258547    11/1986

(Continued)

OTHER PUBLICATIONS

"Universal Mobile Telecommunications System (UMTS); Mandatory speech codes; AMR speech codes; Interface to Iu and Uu (3GPP TS 26.102 Version 4.0.0 Release 4)" ETSI TS 126 102 V4.0.0, XX, Mar. 2001, pp. 1-15, XP002189088 p. 8, line 1-p. 13, line 7; figures.

(Continued)

*Primary Examiner*—Gregory B Sefcheck
(74) *Attorney, Agent, or Firm*—Laurence A. Greenberg; Werner H. Stemer; Ralph E. Locher

(57) ABSTRACT

The present invention relates to a method and apparatus for modification of a connection between a transmitting subscriber and a receiving subscriber in a communications system, which is based on data compression, within a switching center, with a data frame which arrives in the switching center and is formatted on the basis of a framing protocol being replaced independently of the length of the data frame by a new data frame formatted on the basis of the framing protocol, such that additional information can be fed into the connection without any loss of quality or time.

6 Claims, 1 Drawing Sheet

U.S. PATENT DOCUMENTS

| | | | |
|---|---|---|---|
| 6,879,581 B1* | 4/2005 | Leung | 370/352 |
| 6,944,138 B1* | 9/2005 | Song | 370/310.1 |
| 2001/0043605 A1* | 11/2001 | Arakawa | 370/395.1 |
| 2002/0085566 A1* | 7/2002 | Choi | 370/395.64 |
| 2002/0181470 A1* | 12/2002 | Agnevik et al. | 370/395.21 |
| 2003/0086428 A1* | 5/2003 | Quinquis et al. | 370/395.1 |
| 2003/0165143 A1* | 9/2003 | Jormanainen et al. | 370/396 |
| 2003/0193934 A1* | 10/2003 | Dropmann et al. | 370/355 |
| 2003/0219009 A1* | 11/2003 | Unger | 370/352 |
| 2003/0223454 A1* | 12/2003 | Abraham et al. | 370/465 |
| 2004/0213193 A1* | 10/2004 | Longoni | 370/342 |
| 2005/0227695 A1* | 10/2005 | Rasanen et al. | 455/436 |
| 2006/0268845 A1* | 11/2006 | He et al. | 370/352 |
| 2007/0160042 A1* | 7/2007 | Dollo et al. | 370/389 |
| 2008/0059647 A1* | 3/2008 | Jabri et al. | 709/231 |

FOREIGN PATENT DOCUMENTS

| | | |
|---|---|---|
| JP | 11041245 | 2/1999 |
| JP | 11220472 | 8/1999 |
| JP | 2001016205 | 1/2001 |
| JP | 2002111739 A | 4/2002 |
| WO | WO-0118992 A | 3/2001 |
| WO | WO-0161899 A | 8/2001 |
| WO | WO-0191489 A | 11/2001 |

OTHER PUBLICATIONS

Hiroshi Fujiya and Tatsuo Ushiki, "Realtime Voice Communications Over ATM"; NTT Network Service Systems Laboratories; Jul. 1997.

* cited by examiner

METHOD AND APPARATUS FOR MODIFICATION OF CONNECTIONS IN A COMMUNICATIONS SYSTEM WHICH IS BASED ON DATA COMPRESSION

CLAIM FOR PRIORITY

This application claims priority to International Application No. PCT/DE02/03472, which was published in the German language on Apr. 1, 2004.

TECHNICAL FIELD OF THE INVENTION

The present invention relates to a method and an apparatus for modification of connections in a communications system, and in particular, for replacement of data frames which arrive in a switching center of a communications system based on data compression.

BACKGROUND OF THE INVENTION

The Universal Mobile Telecommunications System (UMTS) represents one of a number of mobile radio systems which provide the subscriber of a mobile terminal with a large number of services.

UMTS operates in the bands from 1885 to 2025 MHz and 2110 to 2200 MHz, and also allows data rates of up to 2 Mbit/s by means of the already known functionality of narrowband mobile radio systems.

One aim of the UMTS mobile radio system is to provide a standard third-generation mobile radio system for subscribers throughout the world, and for the first time to allow roaming and handovers between technically different networks, such as GSM (Global System for Mobile Communications) using dual-band and dual-mode terminals.

Owing to the selection of different codec modes for a subscriber A and a subscriber B or in the event of an interruption with TrFO (Transcoder Free Operation), communications networks which are based on the UMTS Standard require the capability to transcode in the UMTS mobile switching centers (UMSC) existing connections from an AMR (Adaptive Multi Rate) codec mode to a different AMR codec mode. A call from a subscriber is transmitted in a compressed form, for example by means of an AMR codec in the case of UMTS, via a speech channel of an air interface in a mobile radio network. An AMR codec contains an algorithm that is specific for it and which compresses speech data. An RNC (Radio Network Controller) in a mobile radio network negotiates a set of AMR modes with a switching center via which the speech connection is intended to be set up before a UMTS speech connection is set up. The switching center has to be able to intervene in the connection in order to make it possible to feed further information into the connection or into the call. In this case as well, it is accordingly necessary to once again code existing connections from an AMR codec mode onto the same AMR codec mode or onto a different AMR codec mode, for example in order to feed in tones based on TDM.

Transcoding such as this is conventionally carried out by decoding data that is transmitted using a first codec mode into 160 linear samples of 13 bits, and by subsequent encoding into a second codec mode. For this purpose, data which has been transmitted to the switching center within a data frame that is transmitted from a radio network UTRAN with a separation of 20 milliseconds is decoded by means of a decoding device, with the data previously having been coded using a first AMR (Adaptive Multi Rate) codec mode. If, for example, this is speech data, then the speech data contained in the speech frame is converted, after it has been decoded, into linear pulse-code-modulated (PCM) words with a length of, for example, 13 bits. These are then compressed using a so-called A/µ law to form words with an information content of 8 bits, and are time-division multiplexed via the time-division multiplexing switching matrix. The time-division multiplexed data is decompressed to form linear pulse-code-modulated words with an information content of, for example, 13 bits, and is then coded in a new AMR codex mode.

Owing to the use of the synchronously operating TDM switching matrix, coding and decoding are required for the insertion of tones and/or announcements, and this necessitates additional coding and decoding system units.

Various UMTS Standard versions may be used within a connection, depending on the various network sections within the communications network, which is based on the UMTS Standard.

SUMMARY OF THE INVENTION

The present invention provides a method and an apparatus to replace data frames for a connection by other data frames, so that, for example, it is possible to insert tones and/or announcements without decoding based on TDM and subsequent back-coding based on ATM.

In one embodiment of the invention, there is a method for modification of a connection between a transmitting subscriber and a receiving subscriber in a communications system, which is based on data compression, within a switching center, in which case a data frame, which is formatted on the basis of a framing protocol and arrives in the switching center is replaced independently of the length of the data frame by a new data frame formatted on the basis of the framing protocol, such that additional information can be fed into the connection without any loss of quality or time.

The data frames may have different lengths.

In one preferred embodiment according to the invention, a UMTS system is chosen as a communications system based on data compression. It is also feasible to use a GERAN system (GSM Edge Radio Access Network). The invention can likewise be used for the replacement of IP data frames, which are transmitted by means of the ATM (Asynchronous Transfer Mode) transmission technology, with the method according to the invention then being used to replace IP data frames by IP data frames.

Figure 1:
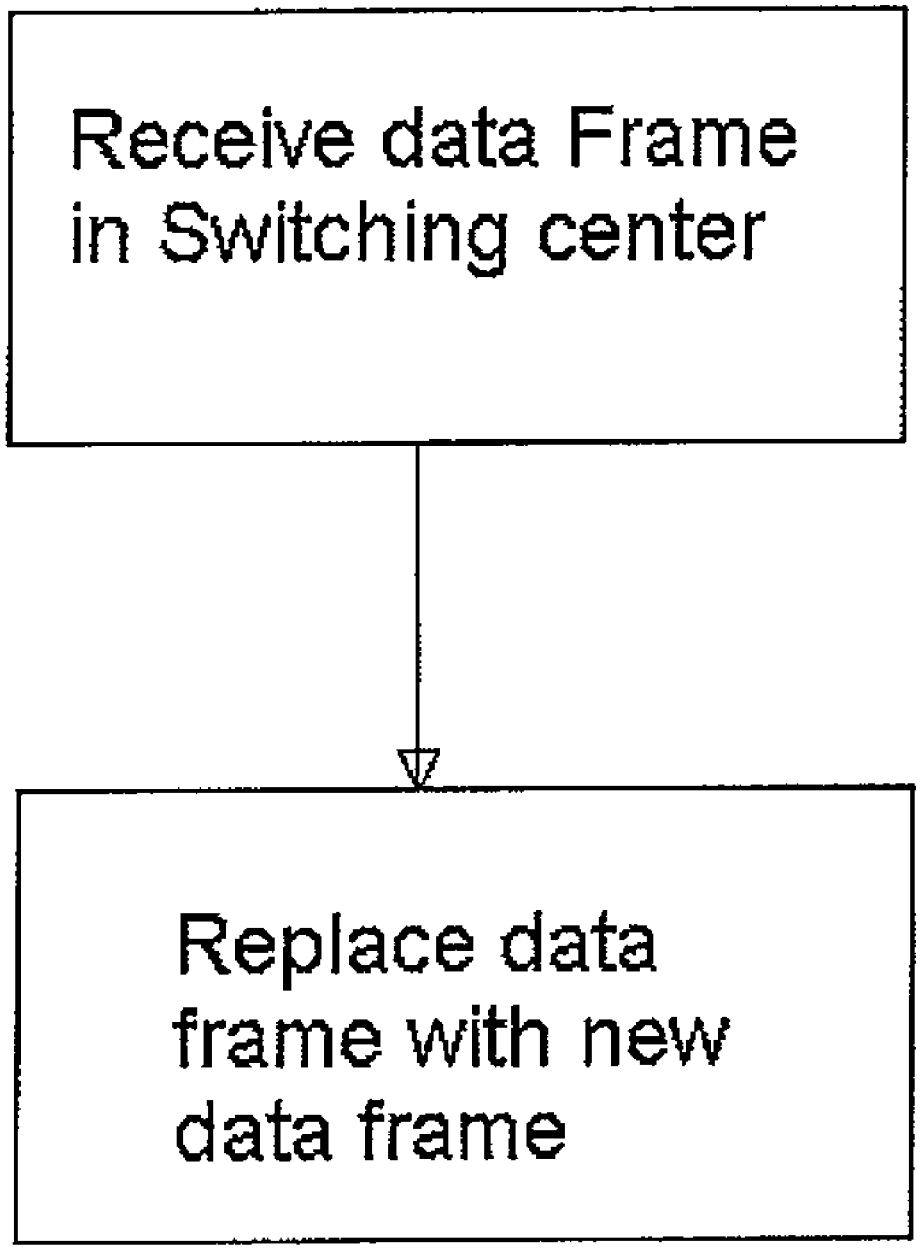
FIG. 1 shows an embodiment of the present invention wherein a data frame is received in the switching center and the data frame is replaced with a new data frame.

Both the data frame arriving at the switching center and the new data frame are preferably subdivided, as a function of their respective length, into one or more AAL2 packets, which are each provided with a packet header field.

Furthermore, the packet header fields of the AAL2 packets are each used to indicate the data frame with which the respective AAL2 packet should be associated. In one particularly preferred embodiment of the invention, the packet header fields of the AAL2 packets are each used to indicate whether any further subsequent AAL2 packets which can be associated with a data frame will follow.

This means that there is no unique association between one data packet and each data frame arriving at the switching center, but that one data frame is segmented by means of two or more AAL2 packets, which are in turn passed on by means of ATM cells.

In order to ensure that the complete data frame which originally arrived at the switching center and which is segmented into one or more AAL2 packets which are then also passed on in the correspondingly correct sequence is replaced, it should be possible to detect whether an AAL2 packet does or does not represent a final packet. Furthermore, it is necessary to know whether an AAL2 packet represents a subsequent packet following a previous AAL2 packet, and whether a subsequent packet exists for an AAL2 packet.

In accordance with ITU-T Recommendations I.362.2 and I.366.1, the data packets are marked in the packet header field (in a UMTS system, these are CPS packets with a corresponding CPS packet header field), in order to define the association with a data frame. The field element in the packet header field, specifically a so-called UUI field (user-to-user indication) is used for this purpose. If the data frame includes only one data packet, a UUI value of less than 27 is used. If the data frame contains two or more data packets, the UUI is set to 27 for all of the data packets in the data frame, and the UUI is then set to less than 27 only for the last data packet.

In order to replace data frames, it is necessary to identify these data frames as an entity. On the basis of one preferred embodiment of the present invention, there is no need for this purpose to reproduce the complete data frames from the individual data packets in a data frame. It is sufficient to check one field element in the packet header field, specifically the already described UUI field of each data packet, and this is referred to as "UUI monitoring". A new data frame starts after a packet whose UUI is less than 27.

When it is intended to start the replacement of data frames, the end of a data frame (packet whose UUI is less than 27) for the connection to be modified is first of all waited for. The aim of this is to avoid the arrival of incomplete frames. After this, complete frames are then replaced by complete frames.

One major aspect of the invention is that, within the switching center, further information can be fed into a connection between a transmitting subscriber and a receiving subscriber, bypassing a coding device and a decoding device and a time-division multiplexing switching matrix.

The length of the new data frames is now chosen, according to the invention, specifically for the receiving subscriber.

In a further preferred embodiment of the invention, additional information is fed, in the switching center, into the new data frame, which is segmented into one or more data packets. The new data packets include, for example, a tone or an announcement.

The advantages of the invention are, in particular, that there is no longer any need for a circuitous route via the TDM coupling network. Until now, decoding based on TDM has had to be carried out for the insertion of tones or announcements, with the tones or announcements then being inserted based on TDM, by replacing speech bytes by tone bytes, and by then carrying out a back-coding process based on AMR.

The data frame length is normally dependent on a desired codec mode and on the payload information in a respective data frame. In this case, by way of example, it is also possible to replace pause frames, so-called SID frames, which are transmitted when the subscriber at the transmission end is not speaking, by one or more, possibly longer, tone frames.

The invention can likewise be used for feeding additional information into a connection when only one empty data frame arrives at the switching center. If, for example, a subscriber A does not transmit any data but only empty data frames, then information can nevertheless be fed into the connection for a receiving subscriber B. In this case, the switching center detects the empty data frames and their respective start, and then sends the information in one or more new data frames, instead of the empty data frames, to the receiving subscriber B.

If no data frames arrive in the unmodified connection, for example during a relatively long speech pause, replacement of data frames is impossible. In this situation, new data frames, for example with tones, are (according to the invention) inserted using a pattern that is provided for that connection.

On the other hand, according to the invention, it is also possible to remove data frames without having to replace them. This is the situation, for example, when the aim is to insert speech pauses into a connection.

Furthermore, the present invention includes the provision of an apparatus for modification of a connection between a transmitting subscriber and a receiving subscriber in a communications system, based on data compression, within a switching device, in which case, a data frame which arrives in the switching center and is formatted on the basis of a framing protocol can be replaced by means of a new data frame formatted on the basis of the framing protocol, irrespective of the length of the data frame, or in which case the data frame which arrives at the switching center can be removed, or in which case, if the data frame which arrives at the switching center is missing, one or more new data frames, which are formatted on the basis of the framing protocol, is or are generated and is or are inserted into the connection.

What is claimed is:

1. A method for modification of a connection between a transmitting subscriber and a receiving subscriber in a communications system, said connection being based on data compression, comprising:

receiving a data frame being formatted based on a framing protocol in a switching center, wherein said data frame arriving at the switching center arrives in a form segmented into multiple AAL2 packets; and replacing said data frame within the switching center independently of a length of the data frame by a new data frame formatted based on the framing protocol to thereby feed additional information including a tone or an announcement into the connection without decoding based on TDM and subsequent back-coding based on ATM, wherein the new data frame is also segmented into multiple AAL2 packets said AAL2 packets each being provided with a packet header field.

2. The method as claimed in claim 1, wherein said communications system based on data compression is an UMTS system.

3. The method as claimed in claim 2, further comprising using the packet header fields of the AAL2 packets to indicate the data frame with which a respective AAL2 packet should be associated.

4. The method as claimed in claim 2,
wherein the packet header fields of the AAL2 packets are each used to indicate whether subsequent AAL2 packets which are associated with a the same data frame will follow.

5. The method as claimed in claim 2,
wherein an end of the data frame of the connection to be modified is delayed before replacement begins, for which the data frames are not recreated from the AAL2 packets, and an end of a data frame is defined by evaluation of a respective packet header field.

6. The method as claimed in 2,
wherein the AAL2 packets are combined into ATM cells, which are specified for a receiving subscriber.

* * * * *